United States Patent
Johnson

[15] 3,664,369
[45] May 23, 1972

[54] PRESSURE REDUCING REGULATOR

[72] Inventor: Dwight N. Johnson, Anaheim, Calif.
[73] Assignee: The Singer Company, New York, N.Y.
[22] Filed: Dec. 9, 1970
[21] Appl. No.: 96,454

[52] U.S. Cl..................137/484.4, 137/505.25, 137/505.26, 137/550
[51] Int. Cl......................................................F16k 17/34
[58] Field of Search...................137/484.4, 505.25, 505.26, 137/550

[56] References Cited

UNITED STATES PATENTS

| | | | |
|---|---|---|---|
| 2,935,083 | 5/1960 | Singer | 137/505.25 |
| 3,372,707 | 3/1968 | Dunn | 137/505.25 |
| 3,459,215 | 8/1969 | Dunn | 137/505.25 |

*Primary Examiner*—Harold W. Weakley
*Attorney*—Lyon & Lyon

[57] ABSTRACT

A pressure regulator of the "straight-through" type employs a stationary valve member clamped between axially aligned tubes carried on inlet and outlet body parts. A flexible diaphragm clamped between the body parts has a seat ring cooperating with a face on the valve member to provide a fully balanced valve construction controlling flow of fluid between the inlet tube and the outlet tube. An inner rim on the diaphragm is clamped between the stationary member and the inlet tube, and a tubular portion of the diaphragm slidably receives the outlet tube. Concentric axially extending convolutions each "U" shaped in cross-section provide rolling diaphragm action adjacent the inner and outer peripheries. A control screen downstream from the stationary valve member diffuses high velocity flow issuing between the valve face and seat ring, and passage means establish communication between the fluid downstream from the control screen and a chamber defined between the diaphragm and the inlet body part. A spring within the body acts to move the diaphragm in a direction opposed by pressure in the chamber. Stiffener plates confine a central portion of the diaphragm between them and are secured together in a manner to eliminate any leakage path. Tubular projections on one plate extend through aligned apertures in the diaphragm and in other plate, each projection having an enlarged integral end wall forming a clamping lip.

13 Claims, 5 Drawing Figures

PATENTED MAY 23 1972 3,664,369

INVENTOR
DWIGHT N. JOHNSON
BY
Lyon & Lyon
ATTORNEYS

INVENTOR
DWIGHT N. JOHNSON
BY
*Lyon & Lyon*
ATTORNEYS

PRESSURE REDUCING REGULATOR

This invention relates to an automatic pressure reducing valve of "straight-through" or "in-line" construction having a flexible diaphragm member as its only moving part. Inlet and outlet body parts are permanently connected together to clamp the outer periphery of the diaphragm between them and to completely encapsulate the internal parts of the regulator, including the outlet pressure spring, thereby eliminating tampering or unauthorized setting of the spring. A stationary valve member is clamped between axially aligned tubes carried on the inlet and outlet body parts. The diaphragm has a seat ring cooperating with a valve face on the stationary member to provide a fully balanced valve construction. Concentric axially extending convolutions each "U" shaped in cross-section provide rolling action of the diaphragm adjacent its connection to the inlet tube and also adjacent its outer periphery. Other objects and advantages will appear hereinafter.

Figure 1:
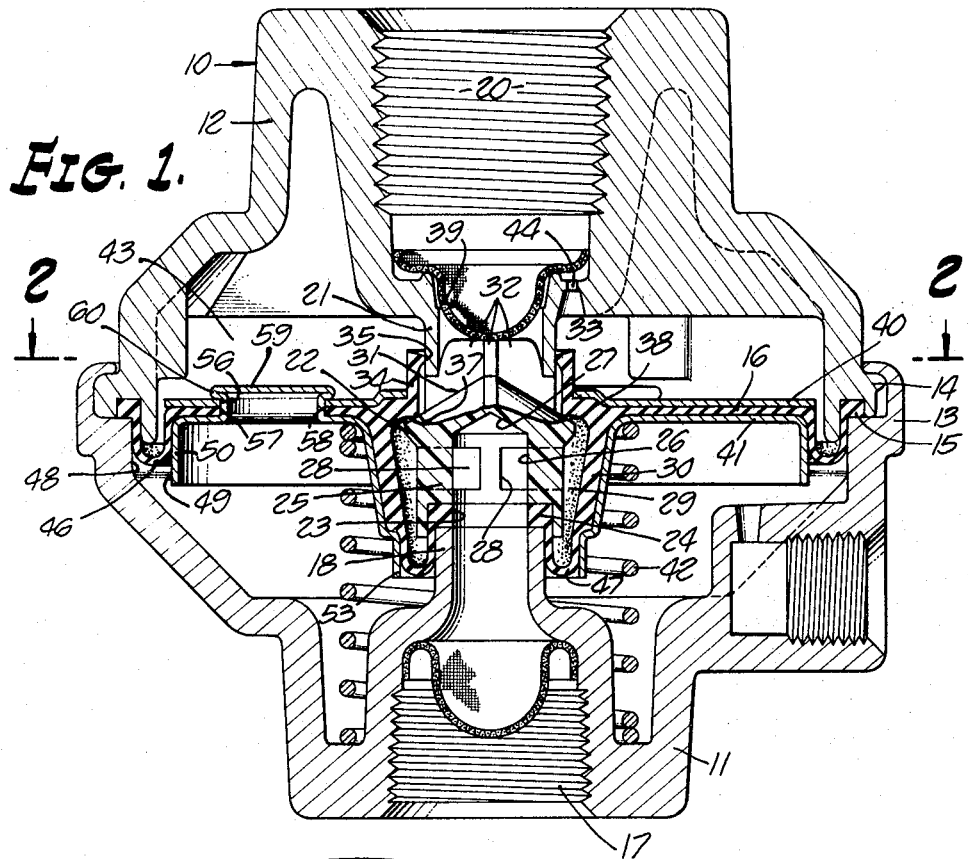
FIG. 1 is a sectional elevation showing a preferred embodiment of this invention.
Figure 2:
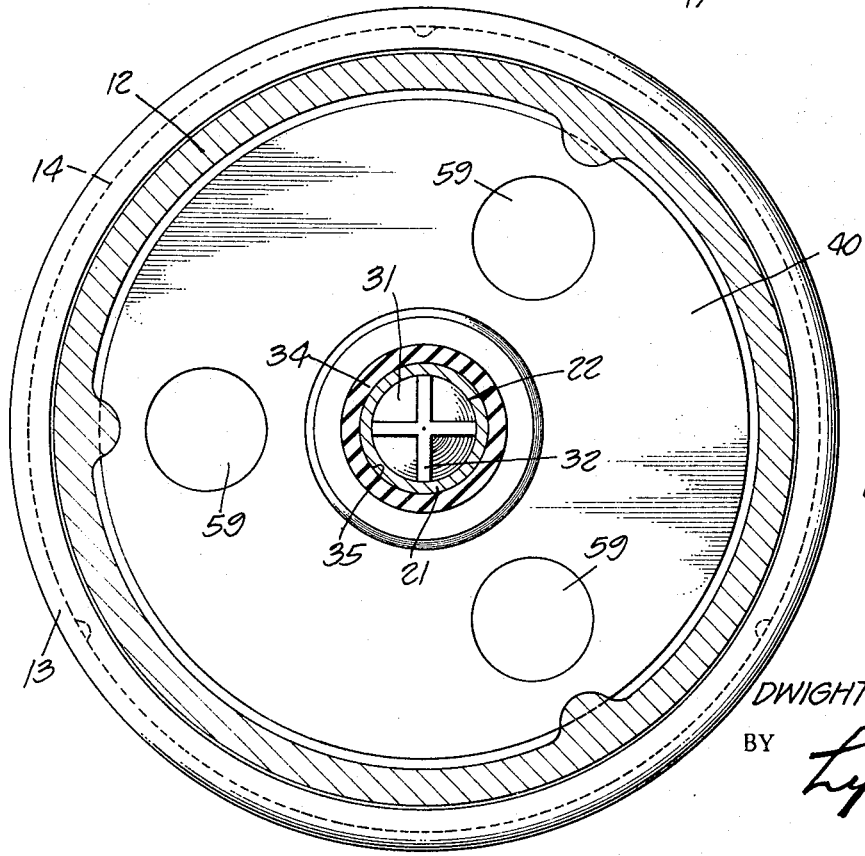
FIG. 2 is a sectional plan view taken substantially on the lines 2—2 as shown in FIG. 1.
Figure 3:
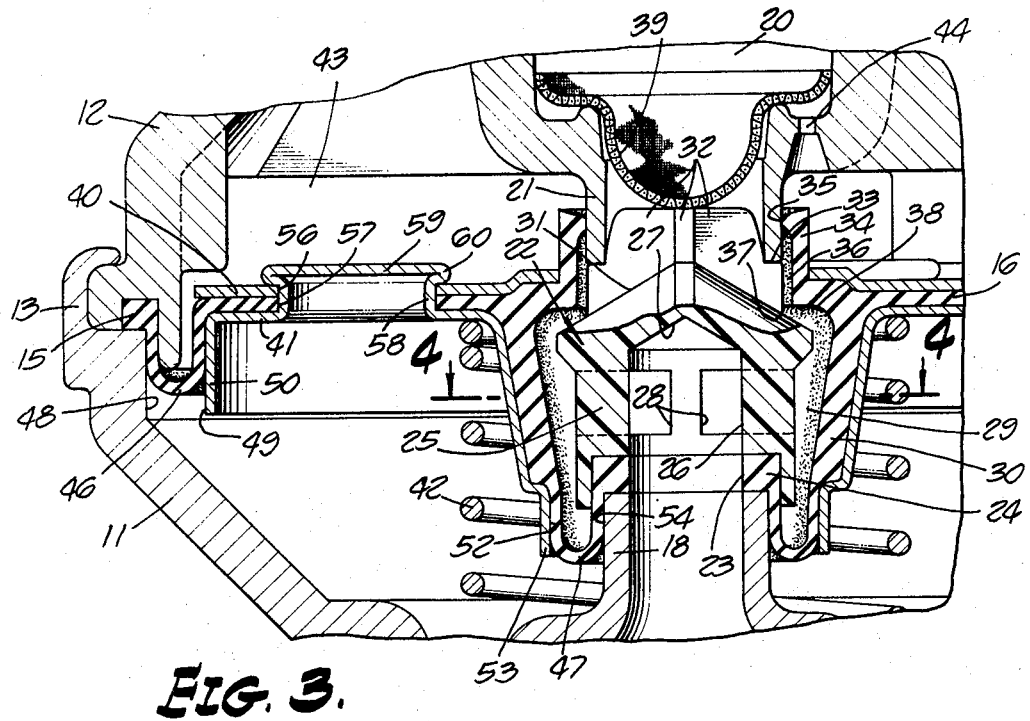
FIG. 3 shows a portion of FIG. 1 on an enlarged scale and shows the valve parts in open position.
Figure 4:
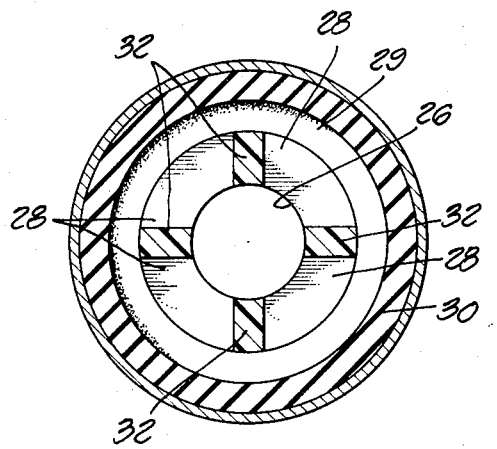
FIG. 4 is a sectional detail taken substantially on the lines 4—4 as shown in FIG. 3.
Figure 5:
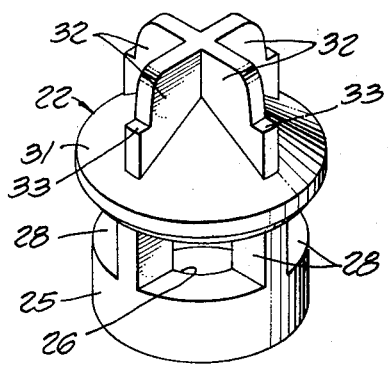
FIG. 5 is a perspective view of the stationary valve member.

Referring to the drawings, the body generally designated 10 includes an inlet body part 11 and an outlet body part 12 secured together by cooperating flanges 13 and 14. The flange 13 is deformed to prevent disassembly. The body parts clamp between them the outer periphery 15 of a flexible diaphragm 16. The inlet body part 11 is provided with an inlet connection 17 and an integral inlet tube 18. Similarly, the outlet body part 12 is provided with an outlet connection 20 and an outlet tube 21. The tubes 18 and 21 are axially aligned and they clamp the stationary valve member 22 between them. The diaphragm 16 has a central opening 23 defined within its inner rim 24, and this rim 24 is clamped between the stationary member 22 and the inlet tube 18.

The stationary valve member 22 has an annular wall 25 provided with a central bore 26 terminating in an integral end wall 27. A plurality of apertures 28 in the wall 25 establish communication between the interior of the stationary member 22 and the annular space or recess 29 formed within the enclosing sleeve portion 30 formed integrally on the diaphragm 16. A conical external valve face 31 is provided on the end wall 27 of the member 22, and the inner portion of the conical surface 31 is interrupted by a plurality of integral axially extending radial straightener fins 32. Each of the fins has a stop shoulder 33 which contacts the inner end of the outlet tube 21.

The diaphragm 16 has a tubular member 34 which forms a sliding seal 35 on the outer cylindrical surface of the outlet tube 21. The cylindrical opening 36 within this member 34 is intersected by the radial surface 38 and the circle of intersection forms a seat ring 37 which cooperates with the outer portion of the conical face 31 to form a seal. When the seat ring 37 contacts the valve face 31, as shown in FIG. 1, flow of fluid is shut off. When the diaphragm 16 moves to produce clearance between the seat ring 37 and the valve face 31, flow of fluid occurs from the inlet pipe 18 through the opening 23 in the diaphragm rim 24, into the bore 26 of the stationary member 22, laterally through the apertures 28 into the annular space or recess 29, and between the valve elements 31 and 37 into the outlet tube 21. The straightener fins 32 eliminate swirling action and direct the high velocity fluid stream issuing between the valve elements 31 and 37 against the control screen 39.

An upper stiffener plate 40 and a lower stiffener plate 41 confine the central portion of the diaphragm 16 between them, and a load spring 42 acts against the lower plate 41 in a direction to open the valve elements 31 and 37. A control chamber 43 is defined between the diaphragm 16 and the upper body part 12, and this chamber is isolated from the high velocity fluid flow through the valve parts by means of the seal 35.

In prior art devices, objectionable regulator "buzz" comprising high frequency oscillations of the controlling element, constitutes a common phenomenon in self-actuated pressure regulators, particularly when controlling higher pressure differentials. Elimination of regulator buzz is accomplished in the device of the present invention by isolation of the diaphragm control chamber 43 from the fluid flow stream by means of the sliding seal 35. Communication of outlet pressure to the control chamber 43 is accomplished through transfer holes 44.

In spring loaded type regulators, a "droop" or sag in outlet pressure must be experienced in order to increase the rate of flow. The amount of droop developed is primarily dependent upon pressure spring rate, but for obvious reasons it is desirable to keep this droop to a minimum. Previously, methods have been devised to reduce or eliminate this droop, primarily by means of "aspirating" the diaphragm control chamber. This creates a control chamber pressure of a lower value than the outlet pressure, thereby permitting the regulator to stroke further. However, controlling the generated aspiration of the correct magnitude is difficult when a wide range of inlet pressures must be accommodated. If aspiration is insufficient, excessive droop will result, while on the other hand, if aspiration is too great, "compounding" of outlet pressure rise will result. A novel solution to this problem of control of aspiration magnitude is achieved in the device of the present invention. Since the amount of aspiration generated is a function of flow stream velocity, a device is provided to control this velocity. The flow straightener fins 32 in the form of a cross on the stationary valve member 22 are provided to direct the flow stream down the central portion of the discharge throat within the outlet tube 21. As inlet pressure increases, the flow stream becomes smaller and of higher velocity. Reduction of this increase in velocity is achieved by the dome shaped control screen 39 installed in the throat which diffuses the fluid stream over a larger area, consequently decreasing the velocity of the stream. Protection from excessive compounding or regulator "run-away" on higher flow rates is achieved by flooding the transfer holes 44 with high pressure. This action begins to take place as flow rates increase to the point where sufficient differentials are generated across the screen 39. Any additional increases in flow rate cause the annular area between the transfer holes and the screen 39 to be "packed" with high pressure, thus minimizing the aspiration effect. A control screen of No. 40 mesh having a wire diameter of 0.010 inches has been found satisfactory in gas distribution service.

The diaphragm 16 is provided with two integral concentric axially extending convolutions 46 and 47, each "U" shaped in cross-section. The convolution 46 is positioned adjacent the outer periphery of the diaphragm 16, and the convolution 47 is positioned adjacent the inner rim 24 and adjacent the sleeve 30 which defines the internal recess 29. When the diaphragm 16 moves axially, the convolutions 46 and 47 have a rolling action between concentric cylindrical surfaces. Thus the convolution 46 rolls between the inner cylindrical surface 48 on the inlet body part 11 and the outer cylindrical surface 49 formed on the rim 50 of the stiffener plate 41. Similarly, the convolution 47 rolls between the inner cylindrical surface 52 on the rim 53 and the outer cylindrical surface 54 on the inlet tube 18. The rolling type diaphragm action for sensing outlet pressure also enhances the regulator design, since the largest effective area for a given stroke and diameter envelope is best afforded by this type diaphragm. Regulator droop is also improved as the rolling type diaphragm maintains a constant area throughout its stroke, unlike conventional convoluted diaphragms which experience an area change when stroked.

Inlet pressure effect upon the regulator device, which in conventional designs normally results in outlet pressure shift as the inlet pressure rises or falls, is virtually eliminated in the device of the present invention because of the "balanced valve" configuration of the parts 31 and 37. Contrary to most so-called balanced valve designs, which normally are only semi-balanced, the balanced valve design of the present invention is of a fully balanced nature, and remains balanced throughout the entire stroke range. The valve 22 remains stationary while the seat ring 31, an integral part of the main diaphragm 16, is the movable or controlling element. The result is that there is a constant exposed area to inlet pressure on the dynamic controlling member. The constant area aspect of the rolling type diaphragm is used to eliminate load change. The total configuration yields a valve design which is totally balanced throughout its entire stroke.

Means are provided for securing the diaphragm stiffener plates 40 and 41 together with the central portion of the diaphragm 16 clamped between them, and this means eliminates any leakage path through the connecting parts. As shown in the drawings, the stiffener plate 40 is provided with a plurality of apertures 56 and the central portion of the diaphragm 16 is provided with aligned apertures 57 of the same size. The lower stiffener plate 41 is provided with a plurality of integral tubular projections 58, each extending through a pair of aligned apertures 56 and 57. Each tubular projection 58 has an enlarged integral end wall 59 of greater diameter than that of the aligned apertures 56 and 57. The projections 58 are deformed after assembly to provide a clamping lip 60 which secures the stiffener plates 40 and 41 and the diaphragm 16 together. No leakage path across the diaphragm 16 is introduced because the metal of the plate 41 is integrally formed with the tubular projections 58, clamping lips 60 and end walls 59.

From the foregoing it will be understood that the device of the present invention produces a totally balanced valve design providing a central in-line flow path through the regulator device. The multi-function elastomeric diaphragm 16, together with its stiffener plates, is the only moving part. The pressure spring 42 is installed at the time of assembly to provide an accurate set point, and the totally balanced valve provides the consistent set point over the full inlet pressure range.

Having fully described my invention, it is to be understood that I am not to be limited to the details herein set forth but that my invention is of the full scope of the appended claims.

I claim:

1. In a pressure regulator assembly, the combination of: a body having an inlet and an outlet, a flexible diaphragm having an outer portion secured to the body and cooperating with the body to define a chamber therein adjacent the outlet, a stationary member within the body encircled by said diaphragm and interposed between said inlet and said outlet, means securing a first inner portion of said diaphragm with respect to said inlet, means forming a sliding seal between a second inner portion of said diaphragm and said outlet, cooperating valve elements on said stationary member and said diaphragm for regulating fluid flow from said inlet to said outlet, means acting to move the central portion of the diaphragm in a direction to open said cooperating valve elements, and means establishing communication between said chamber and fluid downstream from said valve elements.

2. The combination set forth in claim 1 in which the cooperating valve elements include a circular seat ring on the diaphragm movable into closed position against an external valve face on an end wall of said stationary member.

3. In a pressure regulator assembly, the combination of: a body having an inlet and an outlet, a flexible diaphragm within the body and cooperating therewith to define a chamber therein adjacent the outlet, a stationary member within the body encircled by said diaphragm and interposed between said inlet and said outlet, cooperating valve elements on said stationary member and said diaphragm for regulating fluid flow from said inlet to said outlet, a control screen within the body downstream from said valve elements adapted to diffuse high velocity flow, a spring within the body acting to move the central portion of the diaphragm in a direction to increase flow between said cooperating valve elements, and means establishing communication between said chamber and fluid downstream from said control screen.

4. The combination set forth in claim 3 in which the cooperating valve elements include a circular seat ring on the diaphragm movable into closed position against an external valve face on an end wall of said stationary member, and flow straightener fins on said stationary member downstream from said cooperating valve elements.

5. In a pressure regulator assembly, the combination of: an inlet body part having a central inlet tube, an outlet body part having a central outlet tube, said tubes being axially aligned, a flexible diaphragm having an outer periphery clamped between said body parts and having a central opening defined within an inner lip, a stationary member clamped between said tubes and clamping said inner lip with respect to said inlet tube, said diaphragm having a tubular member slidably receiving said outlet tube, and cooperating valve parts on said diaphragm and said stationary member.

6. In combination, a flexible diaphragm having walls forming a central internal recess, a stationary member positioned within said internal recess, said stationary member having an apertured tubular wall and an integral imperforate end wall, said end wall having an external valve face, flow straightener means on said end wall encircled by said valve face, and means on said diaphragm walls defining a circular seat ring adapted to close axially against said valve face.

7. In combination, a flexible diaphragm having walls forming a central internal recess, said diaphragm having two integral concentric axially extending convolutions each "U" shaped in cross-section, one of the convolutions being positioned adjacent the outer periphery of the diaphragm and the other being positioned adjacent said internal recess, a stationary member positioned within said internal recess, said stationary member having an apertured tubular wall and an integral imperforate end wall, said end wall having an external valve face, and said diaphragm walls defining a circular seat ring adapted to close axially against said valve face.

8. In combination, a flexible circular diaphragm having an outer periphery and having a central opening defined within an inner lip, and having walls forming an internal recess adjacent said inner lip, said diaphragm having an integral axially extending convolution "U" shaped in cross-section adjacent said inner lip, a stationary member positioned within said internal recess and fixed relative to said inner lip, said stationary member having an apertured tubular wall and an integral imperforate end wall, said end wall having an external valve face, and means on said diaphragm defining a circular seat ring adapted to close axially against said valve face as permitted by said convolution.

9. In combination, a flexible circular diaphragm having an outer lip on its periphery and having a central opening defined within an inner lip, and having walls forming an internal recess adjacent said inner lip, said diaphragm having two integral axially extending convolutions each "U" shaped in cross-section, one of the convolutions being positioned adjacent said outer lip and the other adjacent said inner lip, a stationary member positioned within said internal recess and receiving said inner lip, said stationary member having an apertured tubular wall and an integral imperforate end wall, said end wall having an external valve face, flow straightener fins on said end wall encircled by said valve face, and said diaphragm walls defining a circular seat ring adapted to close axially against said valve face.

10. In a pressure regulator assembly, the combination of: an inlet body part having a central inlet tube, an outlet body part having a central outlet tube, said tubes being axially aligned, a flexible diaphragm having an outer periphery clamped between said body parts and having a central opening defined within an inner lip, a stationary member interposed between said tubes and clamping said inner lip with respect to the inlet tube on the inlet body part, cooperating valve elements on said stationary member and said diaphragm for regulating fluid flow through said tubes, said diaphragm having a tubular member slidably receiving said outlet tube, whereby fluid may flow through the inlet tube and through said cooperating valve elements and into the outlet tube, a spring within the inlet body part acting to move the central portion of the diaphragm in a direction to open the cooperating valve elements, a chamber defined between said diaphragm and said outlet body part, and means establishing communication between said chamber and the fluid downstream from said outlet tube.

11. The combination set forth in claim 10 in which said diaphragm is provided with two integral concentric axially extending convolutions each "U" shaped in cross-section, one of the convolutions being positioned adjacent the outer periphery of the diaphragm and the other being positioned adjacent said inner lip on the diaphragm.

12. In a pressure regulator assembly, the combination of: an inlet body part having a central inlet tube, an outlet body part having a central outlet tube, said tubes being axially aligned, a flexible diaphragm having an outer periphery clamped between said body parts and having walls forming a central internal recess, a stationary member positioned within said internal recess and interposed between said tubes, said stationary member having an apertured tubular wall and an integral imperforate end wall, said end wall having an external valve face, means on the diaphragm walls defining a circular seat ring adapted to close axially against said valve face, said diaphragm having tubular elements at opposite ends of said central recess, said tubular elements receiving said tubes whereby fluid may flow through said inlet tube into the interior of the stationary member, through the apertured wall thereof into the interior of the central recess in said diaphragm and then between said valve face and said seat ring into the outlet tube, a spring within the inlet body part acting to move the central portion of the diaphragm in a direction to move said circular seat ring away from said valve face, a chamber defined between said diaphragm and said outlet body part, and means establishing communication between said chamber and the fluid downstream from said outlet tube.

13. The combination set forth in claim 12 in which said diaphragm is provided with two integral concentric axially extending convolutions each "U" shaped in cross-section, one of the convolutions being positioned adjacent the outer periphery of the diaphragm and the other being positioned adjacent said inlet tube.

* * * * *